(12) United States Patent
Ishida et al.

(10) Patent No.: US 7,577,518 B2
(45) Date of Patent: Aug. 18, 2009

(54) NAVIGATION SYSTEM

(75) Inventors: Teruyuki Ishida, Zama (JP); Keisuke Mutou, Zama (JP); Yoji Matsuoka, Zama (JP); Takaaki Ishii, Kokubunji (JP); Mami Nomura, Kokubunji (JP); Takashi Yoshimaru, Kokubunji (JP); Tsugumichi Owaki, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 505 days.

(21) Appl. No.: 11/393,831

(22) Filed: Mar. 31, 2006

(65) Prior Publication Data
US 2006/0224316 A1   Oct. 5, 2006

(30) Foreign Application Priority Data
Mar. 31, 2005   (JP)   ............................. 2005-101278

(51) Int. Cl.
*G01C 21/00*   (2006.01)
(52) U.S. Cl. .................. 701/202; 701/206; 701/211
(58) Field of Classification Search .................. None
See application file for complete search history.

(56) References Cited

U.S. PATENT DOCUMENTS

| | | | | |
|---|---|---|---|---|
| 4,914,605 A | * | 4/1990 | Loughmiller et al. ....... | 345/649 |
| 5,414,629 A | * | 5/1995 | Inoue ......................... | 701/210 |
| 5,745,866 A | * | 4/1998 | Steiner ........................ | 701/200 |
| 6,266,613 B1 | * | 7/2001 | Nimura et al. .............. | 701/210 |
| 6,363,322 B1 | * | 3/2002 | Millington .................. | 701/211 |
| 6,415,224 B1 | * | 7/2002 | Wako et al. ................. | 701/208 |
| 6,687,614 B2 | * | 2/2004 | Ihara et al. .................. | 701/209 |
| 6,732,047 B1 | * | 5/2004 | de Silva ...................... | 701/209 |
| 6,810,327 B2 | * | 10/2004 | Akashi ........................ | 701/209 |
| 2003/0023375 A1 | * | 1/2003 | Yoshida ...................... | 701/212 |
| 2003/0130788 A1 | | 7/2003 | Akashi | |

FOREIGN PATENT DOCUMENTS

| CN | 1431467 A | 7/2003 |
|---|---|---|
| JP | 2000-111354 A | 4/2000 |

OTHER PUBLICATIONS

Chinese Office Action dated Nov. 28, 2008 (five (5) pages).

\* cited by examiner

*Primary Examiner*—Michael J. Zanelli
(74) *Attorney, Agent, or Firm*—Crowell & Moring LLP

(57) ABSTRACT

A navigation system includes: a roadmap display unit that displays a roadmap at a display monitor; a current position detection unit that detects a current position of the navigation system; a setting unit that sets a right turn instruction or a left turn instruction for an intersection displayed in the roadmap; and a guidance unit that provides guidance based upon the right turn instruction or the left turn instruction having been set, as the detected current position moves to a point at or within a predetermined distance to the intersection having been set via the setting unit.

8 Claims, 12 Drawing Sheets

NAVIGATION SYSTEM

The disclosure of the following priority application is herein incorporated by reference:

Japanese Patent Application No. 2005-101278 filed Mar. 31, 2005

BACKGROUND OF THE INVENTION

1. Field of the Invention

The present invention relates to a navigation system that provides guidance at intersections.

2. Description of Related Art

There is a navigation system known in the related art that sets a road traced with a finger or a touch pen on a display screen as a road which the user wishes to take en route to a destination (see Japanese Laid Open Patent Publication No. 2000-111354).

SUMMARY OF THE INVENTION

The user needs to indicate the road he wishes to travel on by tracing the road on the display screen with his finger to enable the navigation system disclosed in Japanese Laid Open Patent Publication No. 2000-111354 to provide route guidance to the destination. When tracing the road, the user needs to concentrate on the task so as not to move the finger or touch pen off the road. If the navigation system is installed in a vehicle in which the steering wheel is located on the right-hand side, the user must trace the road with his left hand, which makes it more difficult to trace the road accurately.

According to the 1st aspect of the invention, a navigation system comprises: a roadmap display unit that displays a roadmap at a display monitor; a current position detection unit that detects a current position of the navigation system; a setting unit that sets a right turn instruction or a left turn instruction for an intersection displayed in the roadmap; and a guidance unit that provides guidance based upon the right turn instruction or the left turn instruction having been set, as the detected current position moves to a point at or within a predetermined distance to the intersection having been set via the setting unit.

According to the 2nd aspect of the invention, in the navigation system according to the 1st aspect, it is preferred that: the navigation system is installed in a vehicle; and the current position detection unit detects a current position of the vehicle in which the navigation system is installed.

According to the 3rd aspect of the invention, in the navigation system according to the 1st or the 2nd aspect, it is preferred that: there is further provided a touch panel disposed over the display monitor; and as an intersection displayed in the roadmap is specified via the touch panel, the setting unit sets a right turn instruction or a left turn instruction to be provided at the specified intersection.

According to the 4th aspect of the invention, in the navigation system according to the 1st or the 2nd aspect, it is preferred that: there is further provided a touch panel disposed over the display monitor; and after a right turn input button or a left turn input button is specified via the touch panel at the display monitor at which the right turn input right turn and the left turn input button are on display and then an intersection displayed in the roadmap is specified via the touch panel, the setting unit sets a right turn instruction or a left turn instruction at the specified intersection in correspondence to the right turn input button or the left turn input button having been specified.

According to the 5th aspect of the invention, in the navigation system according to any of the 1st through the 4th aspects, it is preferred that the setting unit sets a right turn instruction or a left turn instruction for each intersection at which a right turn or a left turn is to be made.

According to the 6th aspect of the invention, in the navigation system according to any of the 1st through the 5th aspects, it is preferred that the setting unit displays a mark indicating a right turn or a left turn at the intersection having been set.

According to the 7th aspect of the invention, in the navigation system according to any of the 1st through the 6th aspects, it is preferred that as the detected current position moves to a point at or within a predetermined distance to the intersection having been set via the setting unit, the guidance unit displays a mark indicating a right turn or a left turn based upon the right turn instruction or the left turn instruction having been set.

According to the 8th aspect of the invention, in the navigation system according to claim 7th aspect, it is preferred that if a display direction of the roadmap is adjusted to set an advancing direction of the vehicle pointing upward at the display monitor, the guidance unit displays the mark indicating the right turn or the left turn so that the direction of the right turn or the left turn indicated by the mark remains unchanged regardless of the advancing direction of the vehicle, and if the display direction of the roadmap remains unchanged, the guidance unit displays the mark indicating the right turn or the left turn so that the direction of the right turn or the left turn indicated by the mark matches a direction along which the vehicle turns right or left at the intersection.

According to the 9th aspect of the invention, in the navigation system according to any of the 1st through the 8th aspects, it is preferred that as the detected current position moves to a point at or within a predetermined distance to the intersection having been set via the setting unit, the guidance unit provides audio guidance indicating a right turn or a left turn based upon the right turn instruction or the left turn instruction having been set.

DESCRIPTION OF PREFERRED EMBODIMENT

Figure 1:
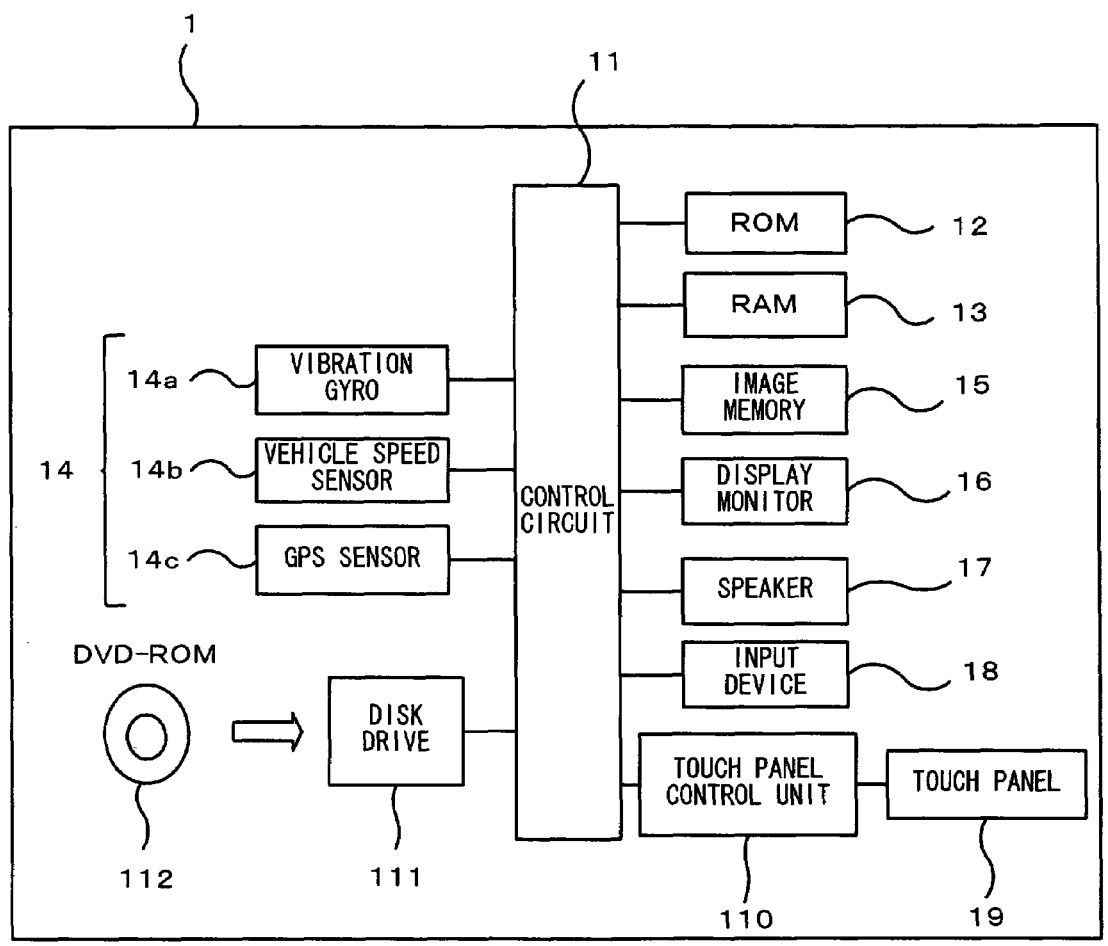
FIG. 1 is a block diagram of the structure adopted in the navigation system achieved in an embodiment of the present invention.

FIG. 1 shows the structure adopted in a navigation system achieved in an embodiment of the present invention. In the navigation system 1 in FIG. 1, a desired position on a roadmap can be specified by depressing a touch panel 19. The navigation system 1 includes a control circuit 11, a ROM 12, a RAM 13, a current position detection device 14, an image memory 15, a display monitor 16, a speaker 17, an input device 18, a touch panel 19 and a disk drive 111.

The touch panel 19 is a transparent touch switch laminated over the front surface of the display monitor 16. An image displayed at the display monitor 16 is seen through the touch panel 19. The touch panel 19 outputs a signal corresponding to an operating position on the touch panel 19 to a touch panel control unit 110, which, in turn, calculates the position at which the touch panel 19 has been depressed. A DVD-ROM 112 having recorded therein map data to be display at the display monitor 16, is loaded in the disk drive 111. The map data include map display data, route search data and the like. The route search data include link information and node information for the roads in the map data. As the map display data, map data at a plurality of scaling factors, from wide area to highly detailed, are provided, and the scaling factor of the map on display can be switched in response to a request from the user.

The control circuit 11, constituted with a microprocessor and its peripheral circuits, executes various types of control as it executes a control program stored in the ROM 12 by using the RAM 13 as a work area. The results of a specific type of route search processing executed by the control circuit 11 based upon the map data stored in the DVD-ROM 112 are displayed as a searched route at the display monitor 16.

The current position detection device 14, which detects the current position of the vehicle, may be constituted with a vibration gyro 14a that detects the advancing direction of the vehicle, a vehicle speed sensor 14b that detects the vehicle speed, a GPS sensor 14c that detects a GPS signal transmitted from a GPS (global positioning system) satellite. Based upon the current position of the vehicle detected by the current position detection device 14, the navigation system 1 determines the map display range, the route search start point and the like and also indicates the current position on the map.

In the image memory 15, image data to be displayed at the display monitor 16 are stored. These image data, which include roadmap drawing data and various types of graphic data, are generated as necessary based upon the map data stored in the DVD-ROM 112 read by the disk drive 111. The navigation system 1 is able to bring up map display and the like by using the image data thus generated.

Various types of information such as a roadmap of an area around the subject vehicle position are provided to the user of the navigation system 1 as screen display at the display monitor 16 based upon various types of information including the map data. Through the speaker 17, audio instructions for guiding the user through various input operations and for providing route guidance for the user are generated. The input device 18 includes input switches through which the user sets various commands, and may be constituted with a remote-control device or the like. The user manually operates the input device 18 as prompted by instructions on the display screen at the display monitor 16 to select and set a destination.

As explained earlier, the touch panel 19 is a transparent panel disposed on the monitor screen at the display monitor 16, and the display on the display monitor 16 is viewed through the touch panel 19. As the user presses on or touches the display screen at the display monitor 16, the touch panel is depressed. As does the input device 18, the touch panel 19 has an input function. As a map display, one of various buttons, a display menu or the like brought up at the display monitor 16 is depressed with his finger, the touch panel 19 is depressed, and the touch panel control unit 110 calculates the depressed position. The depressed position having been calculated is then input to the control circuit 11 to enable the control circuit 11 to set a destination or to execute a function corresponding to the selected button or display menu.

As the user sets a destination, the navigation system 1 executes an arithmetic operation based upon a specific algorithm to determine a route to the destination from a start point set at the current position detected by the GPS sensor 14c. The route thus determined (hereafter referred to as a "searched route") is indicated in the screen in a manner distinguishable from other roads by adopting a different display mode, e.g., by using a different display color or the like. As a result, the user is easily able to identify the searched route on the map in the screen. In addition, the navigation system 1 guides the vehicle along the searched route by providing visual instructions on the screen, audio instructions or the like to the user as the vehicle advances.

The navigation system 1 allows a route to the destination to be set so as to travel through guidance-requiring intersections-specified for right/left turn instructions, as well as determining a searched route to the destination by executing the route calculation. Instead of providing route guidance so as to ensure that the vehicle travels along the searched route, the navigation system 1 may provide route guidance so that the vehicle travels along a route set by specifying right/left turn instructions to be provided at guidance-requiring intersections. The latter route guidance is to be described in detail later.

The disk drive 111 reads out map data to be used to display a map at the display monitor 16 from the DVD-ROM 112 loaded therein. It is to be noted that the map data may be read out from a recording medium other than a DVD ROM 112, such as a CD-ROM or a hard disk.

Figure 2:
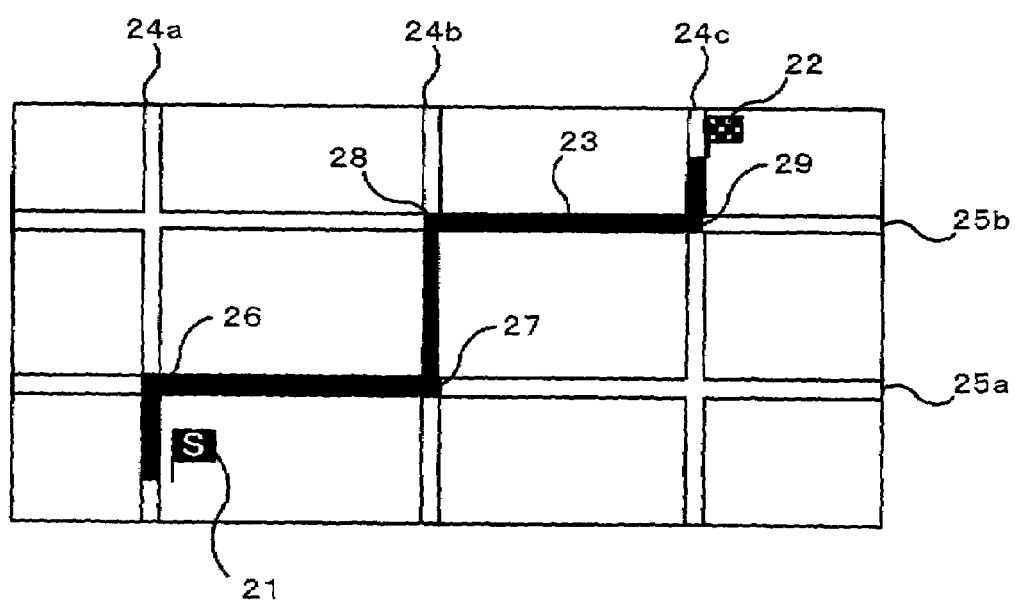
FIG. 2 shows a possible route that may be taken from the start point to the destination.

Next, in reference to FIGS. 2 through 8, the operation executed as the user specifies right/left turn instructions to be provided at guidance requiring intersections by depressing the touch panel so as to receive route guidance to the destination through the route desired by the user is explained. FIG. 2 illustrates the route that the user wishes to take from the start point to the destination. It is assumed that the user wishes to travel from a start point 21 to a destination 22 through a route 23. The vehicle traveling on the route 23 will first travel on a road 24a from the start point 21, take a right turn at an intersection 26 onto a road 25a, take a left turn at an intersection 27 onto a road 24b, take a right turn at an intersection 28 onto a road 25b, and take a left turn at an intersection 29 onto a road 24c to reach the destination 22.

Figure 3:
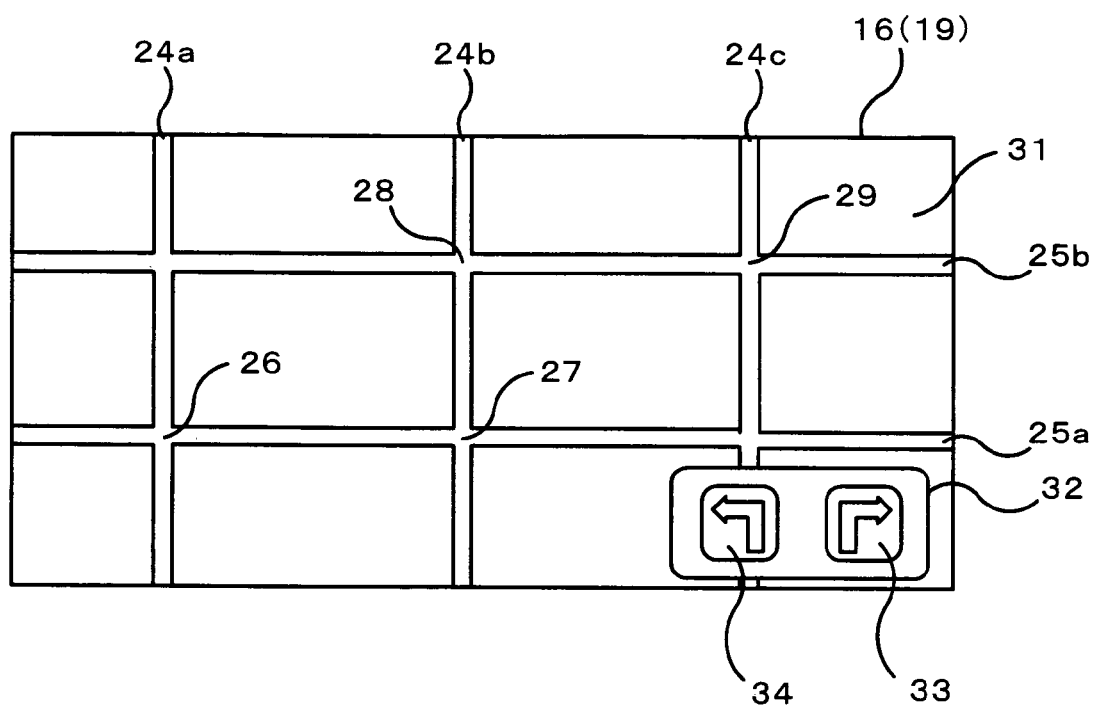
FIG. 3 shows a display screen that may be brought up at the display monitor when route guidance to the destination is set by specifying right/left turn instructions to be provided at intersections.

As the user depresses a setting input button (not shown) to set the route guidance to the destination by specifying right/left turns at intersections, the display screen in FIG. 3 is brought up at the display monitor 16. On the display screen, a right/left turn specifying area 32 is displayed on a roadmap 31. It is assumed that the roads 24a through 24c and the roads 25a and 25b are displayed in the roadmap 31. A right turn input button 33 and a left turn input button 34 are displayed in the right/left turn specifying area 32.

As the right turn input button 33 is depressed, it enters a valid state and as an intersection on the roadmap 31 is depressed in this state, a right turn instruction to be provided as the subject vehicle approaches the intersection, is specified. If the right turn input button 33 in a valid state is depressed again, the right turn input button 33 becomes invalid. Even if the intersection is depressed, it cannot be specified for a right turn instruction while the right turn input button is in an invalid state. In addition, as the left turn input button 34 is depressed and the left turn input button 34 enters a valid state, the right turn input button 33 is automatically invalidated.

As the left turn input button 34 is pressed down, it enters a valid state and as an intersection on the roadmap 31 is depressed in this state, a left turn instruction to be provided as the subject vehicle approaches the intersection, is specified. If the left turn input button 34 in a valid state is depressed again, the left turn input button 34 becomes invalid. Even if the intersection is depressed, it cannot be specified for a left turn instruction while the left turn input button is in the invalid state. In addition, the right turn input button 33 enters a valid state, the left turn input button 34 is automatically invalidated.

Figure 4:
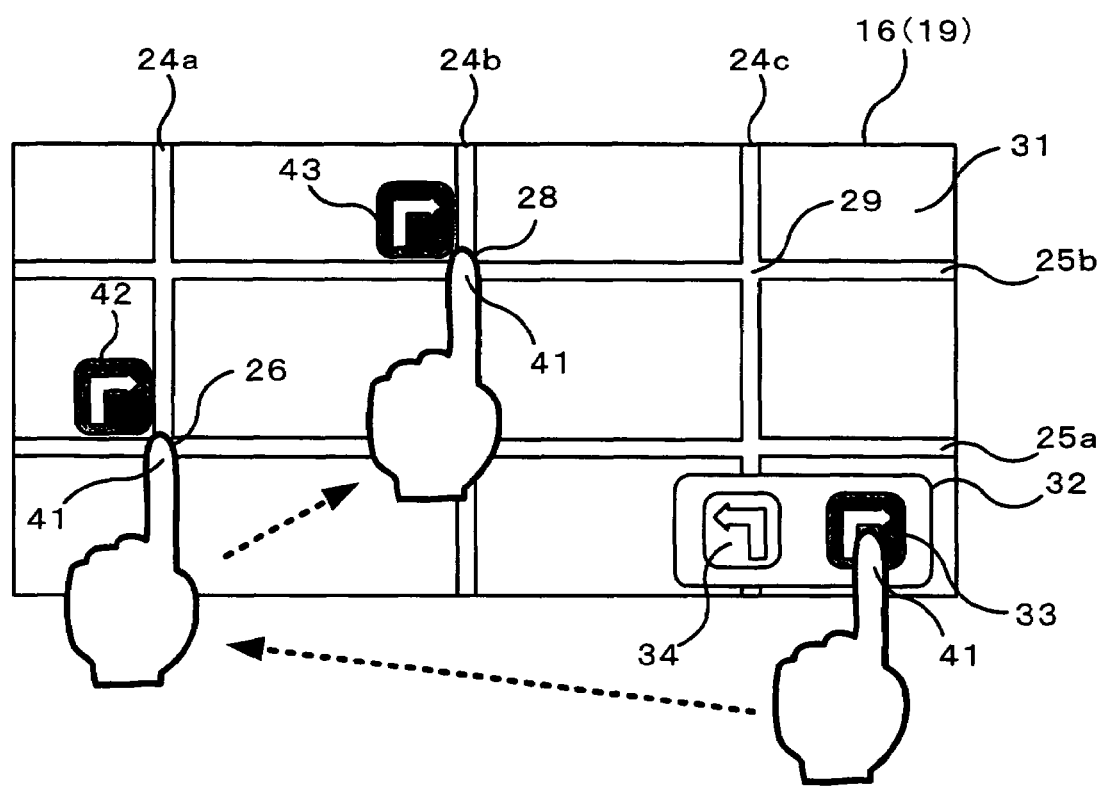
FIG. 4 illustrates an operation performed to specify right turn instructions at intersections.

In order for the vehicle to reach the destination 22 from the start point 21 through the route 23 desired by the user, the vehicle needs to make right turns at the intersections 26 and 28. Accordingly, the user depresses the right turn input button 33 with his finger 41 to set it in a valid state and then depresses the intersections 26 and 28 with the finger 41, as shown in FIG. 4. As the user depresses the intersections 26 and 28 to specify right turn instructions to be provided at the intersections, right turn marks 42 and 43 are brought up on display.

Figure 5:
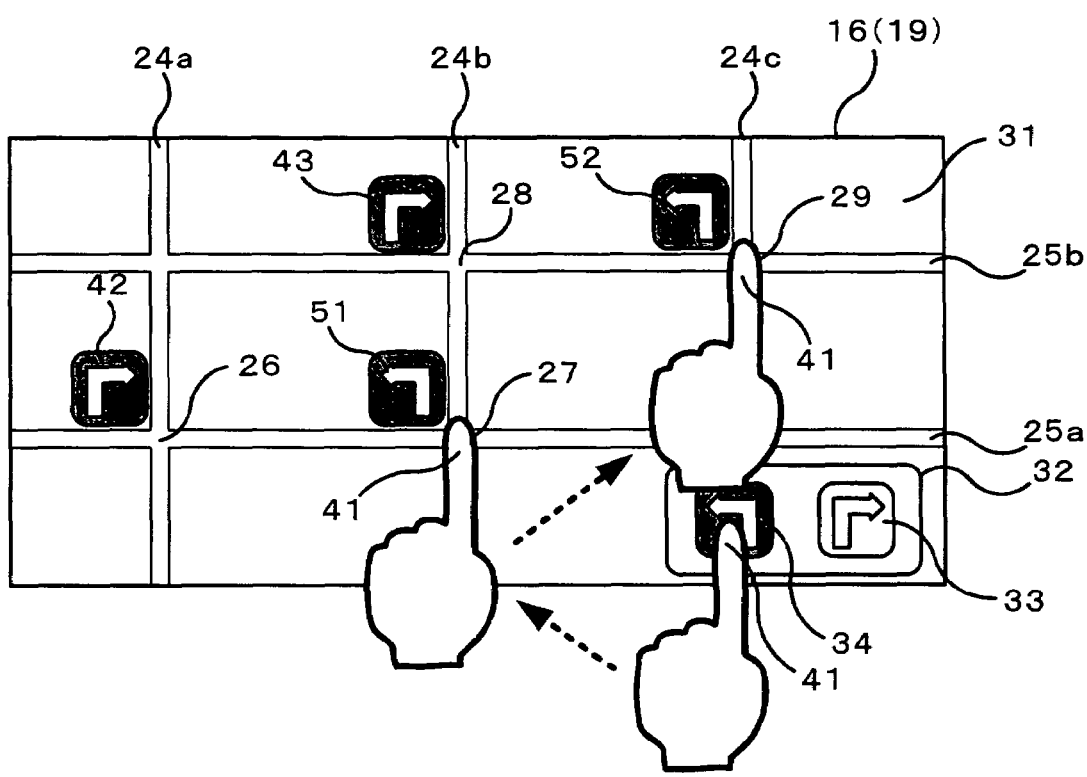
FIG. 5 illustrates an operation performed to specify left turn instructions to be provided at intersections.

In order for the vehicle to reach the destination 22 from the start point 21 through the route 23 desired by the user, the vehicle needs to make left turns at the intersections 27 and 29. Accordingly, the user depresses the left turn input button 34 with his finger 41 to set it in a valid state and then depresses the intersections 27 and 29 with the finger 41, as shown in FIG. 5. As the user depresses the intersections 27 and 29 to specify left turn instructions to be provided at the intersections, left turn marks 51 and 52 are brought up on display.

Figure 6:
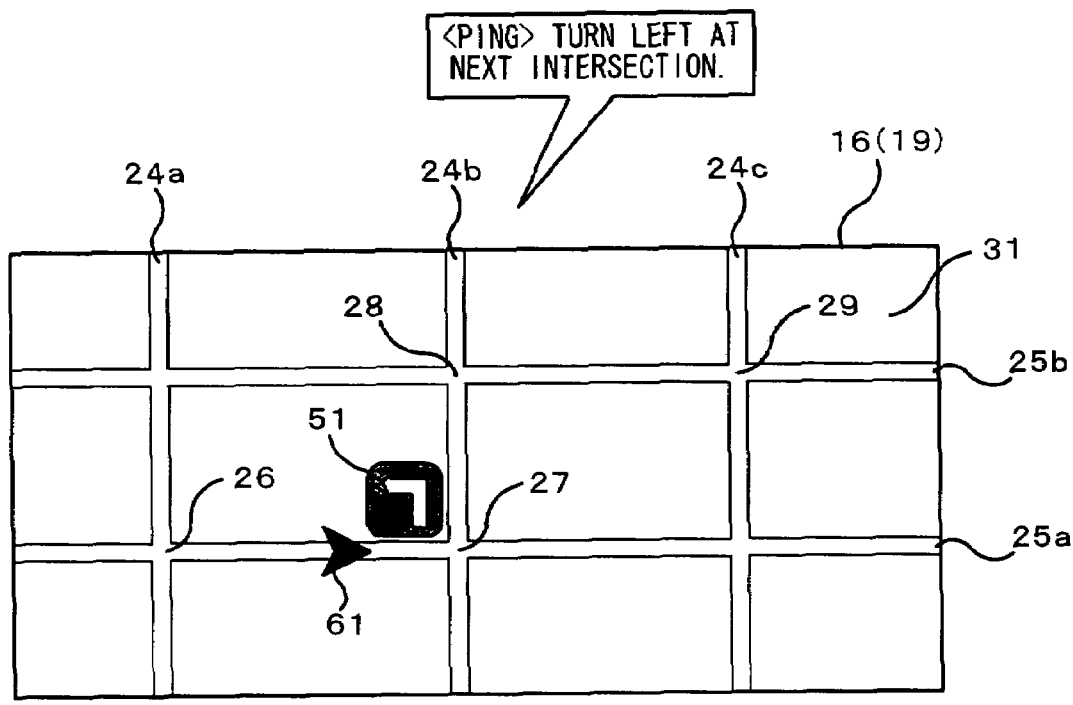
FIG. 6 illustrates a display screen that may be brought up at the display monitor as the vehicle approaches an intersection specified for a left turn instruction.

Next, the route guidance provided by the navigation system 1 for which the route is set by specifying the right/left turn instructions to be provided at the intersections is explained in reference to FIG. 6. FIG. 6 illustrates the display screen brought up at the display monitor 16 as the subject vehicle 61 approaches the intersection 27, ready to receive route guidance with the left turn instruction to be provided by the navigation system 1. The roadmap 31 at the display monitor 16 is displayed with a north-up direction, regardless of the actual direction of the subject vehicle 61. While the navigation system 1 is executing the route guidance, the right turn marks 42 and 43 and the left turn marks 51 and 52 are not displayed in the roadmap 31, in principle.

However, as the subject vehicle 61 travels to a point within a predetermined distance from an intersection having been specified for a right turn instruction or a left turn instruction, the right turn mark 42 or 43 or the left turn mark 51 or 52 comes up on the display. Since a left turn instruction has been specified to be provided at the intersection 27, the left turn mark 51 comes up on display as the subject vehicle approaches the intersection 27. Then, an audio instruction "<ping> turn left at the next intersection" is output through the speaker 17 as the route guidance for the user.

Figure 7:
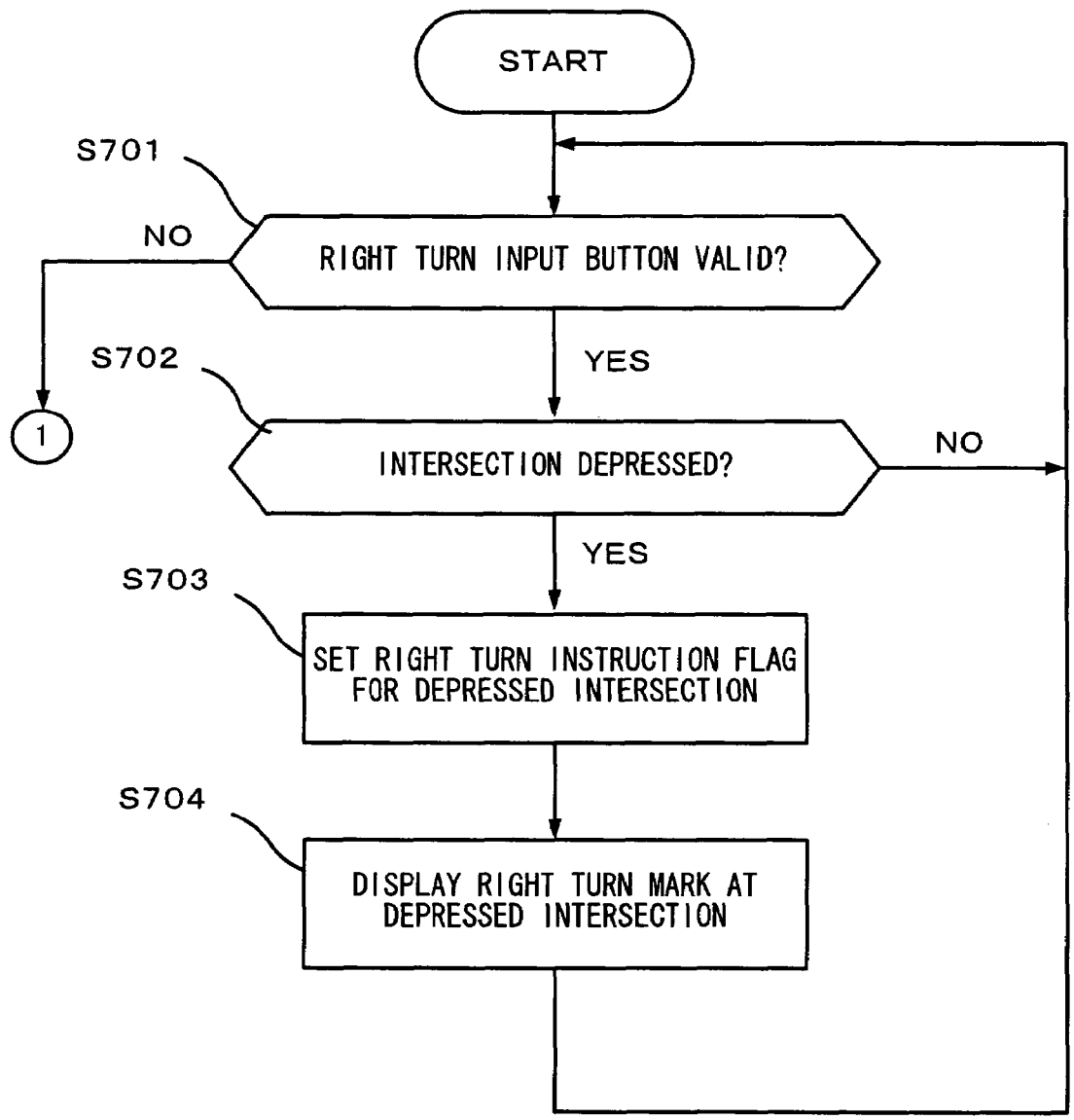
FIG. 7 presents a flowchart of the intersection right/left turn specification processing.
Figure 8:
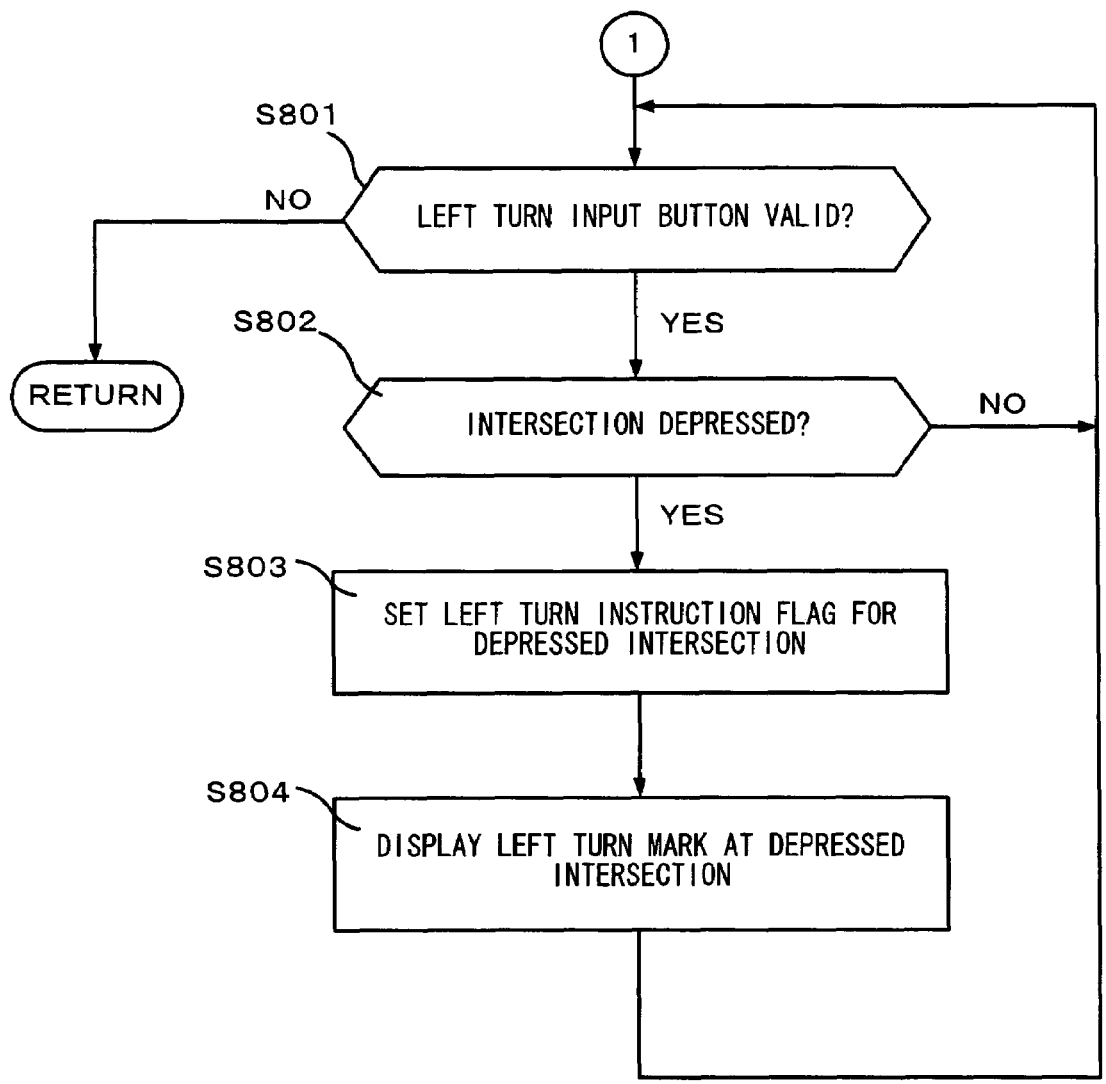
FIG. 8 presents a flowchart of the intersection right/left turn specification processing.

Next, intersection right/left turn specification processing is explained in reference to the flowchart presented in FIGS. 7 and 8. The processing in FIGS. 7 and 8 is executed by the control circuit 11 in conformance to a program started up as the user depresses the setting input button (not shown) to set route guidance to the destination by specifying right/left turn instructions to be provided at intersections.

In step S701, a decision is made as to whether or not the right turn input button 33 is currently valid. An affirmative decision is made in step S701 if the right turn input button is in a valid state to proceed to step S702. A negative decision is made in step S701 if it is in an invalid state, and in this case, the operation proceeds to step S801. As the right turn input button 33 in an invalid state is depressed, it enters a valid state, and as the right turn input button in a valid state is depressed, it enters an invalid state. In addition, the right turn input button 33 is invalidated as the left turn input button 34 enters a valid state.

In step S702, a decision is made as to whether or not an intersection has been depressed. The decision as to whether or not an intersection has been depressed is made by converting a position on the touch panel having been depressed to positional coordinates on the roadmap 31 and determining whether or not a node indicating an intersection, i.e., a node to which three or more links are connected, is present within a predetermined range around the positional coordinates. If an intersection has been depressed, an affirmative decision is made in step S702 and the operation proceeds to step S703. If an intersection has not been depressed, on the other hand, the operation returns to step S701.

In step S703, a right turn instruction flag is set for the intersection having been depressed by appending right turn instruction information to the node information for the node corresponding to the depressed intersection. In step S704, a right turn mark is displayed at the depressed intersection. Then the operation returns to step S701.

In step S801 in FIG. 8, a decision is made as to whether or not the left turn input button 34 is currently valid. An affirmative decision is made in step S801 if the right turn input button is in a valid state to proceed to step S802. A negative decision is made in step S801 if it is in an invalid state, and in this case, the operation makes a return. As the left turn input button 34 in an invalid state is depressed, it enters a valid state, and as the left turn input button in a valid state is depressed, it enters an invalid state. In addition, the left turn input button 34 is invalidated as the right turn input button 33 enters a valid state.

In step S802, a decision is made as to whether or not an intersection has been depressed. If an intersection has been depressed, an affirmative decision is made in step S802 and the operation proceeds to step S803. If an intersection has not been depressed, on the other hand, the operation returns to step S801.

In step S803, a left turn instruction flag is set for the intersection having been depressed by appending left turn instruction information to the node information for the node corresponding to the depressed intersection. In step S804, a left turn mark is displayed at the depressed intersection. Then the operation returns to step S801.

If an intersection for which a left turn instruction flag has been set is depressed while the right turn input button 33 is in a valid state, the left turn instruction flag is cleared and a right turn instruction flag is set for the depressed intersection. If, on the other hand, an intersection for which a right turn instruction flag has been set is depressed while the left turn input button 34 is in a valid state, the right turn instruction flag is cleared and a left turn instruction flag is set for the depressed intersection. Thus, if both a right turn instruction and a left turn instruction are specified for a given intersection, the most recent specification is validated.

Figure 9:
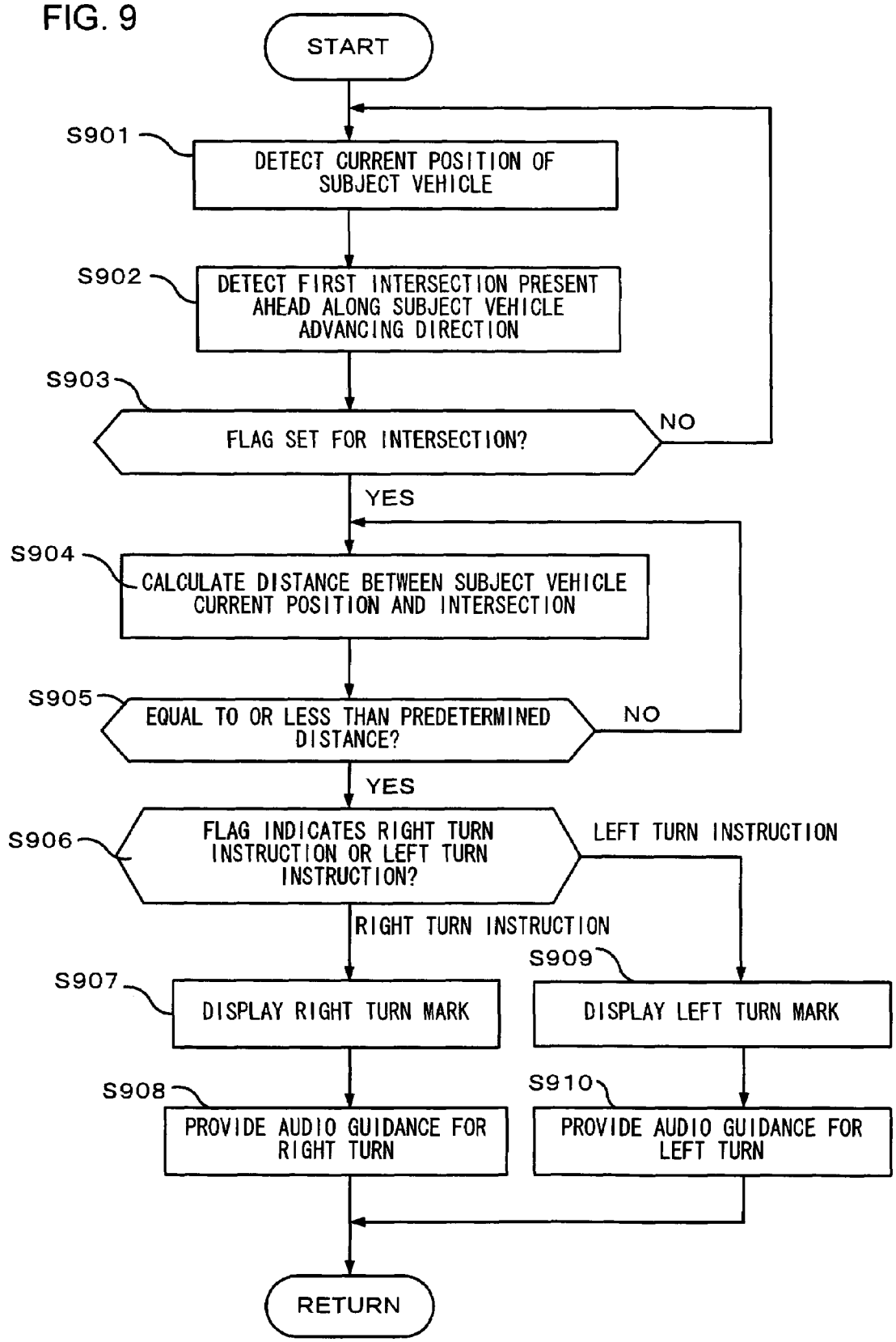
FIG. 9 presents a flowchart of the route guidance processing executed in the navigation system achieved in the embodiment.

Next, route guidance processing executed in the navigation system 1 in the embodiment is explained in reference to FIG. 9. The processing in FIG. 9 is executed by the control circuit 11 in conformance to a program which is started up as a route guidance button (not shown) is depressed by the user to start route guidance having been set by specifying right/left turns to be taken at intersections.

In step S901, the current position detection device 14 detects the current position of the subject vehicle.

In step S902, the first intersection present ahead along the vehicle advancing direction is detected. The first intersection is detected through the following method. Based upon the current position detected in step S901 and the map data stored in the DVD-ROM 112, a link corresponding to the current position is extracted. Then, the link connecting with the link corresponding to the current position along the vehicle advancing direction is extracted, and the node information for the node corresponding to the extracted link is extracted. A decision is then made based upon the node information as to whether or not the node connects with three or more links. If the node connects with three or more links, the node is determined to be the first intersection. If the node does not connect with three or more links, the next link is extracted and the node information of the node corresponding to the link is extracted. Subsequently, a decision is made as to whether or not the corresponding node connects with three or more links. By making this decision repeatedly until a node is determined to connect with three or more links, the first intersection present along the vehicle advancing direction is detected.

In step S903, a decision is made as to whether a right turn instruction flag or a left turn instruction flag is set for the first intersection. If either flag is set, an affirmative decision is made in step S903 to proceed to step S904. If no flag is set, the operation returns to step S901.

In step S904, the distance between the current position of the subject vehicle and the intersection is calculated.

In step S905, a decision is made as to whether or not the calculated distance is equal to or less than a predetermined distance. Based upon the results of this decision, the subject vehicle is judged to be either nearing the intersection set for the right turn/left turn instruction or still far away from the intersection. An affirmative decision is made in step S905 if the calculated distance is equal to or less than the predetermined distance and the operation proceeds to step S906. If, on the other hand, the calculated distance exceeds the predetermined distance, a negative decision is made in step S905 and the operation returns to step S904.

In step S906, a decision is made as to whether the flag indicates a right turn instruction or a left turn instruction. If the flag is judged to indicate a right turn instruction, the operation proceeds to step S907, whereas the operation proceeds to step S909 if the flag is judged to indicate a left turn instruction.

In step S907, the right turn mark 42 or 43 is brought up on display in the roadmap 31. Then, in step S908, an instruction for making a right turn at the next intersection is provided through an audio message output at the speaker 17.

In step S909, the left turn mark 51 or 52 is brought up on display in the roadmap 31. Then, in step S910, an instruction for making a left turn at the next intersection is provided through an audio message output at the speaker 17.

The following advantages are achieved in the navigation system 1 in the embodiment described above.

(1) The navigation system in the embodiment provides route guidance to the destination through a route desired by the user in response to a simple operation of depressing intersections at which right turns or left turns are to be made without requiring the user to trace roads.

(2) Instead of setting the route itself to the destination, the user only needs to specify intersections where the vehicle is to take right or left turns, i.e., key points on the route to the destination, to receive route guidance to the destination and thus, a route is set through a simple procedure.

(3) Since the user is able to freely specify intersections at which route guidance is to be provided by the navigation system 1, the route guidance by the navigation system 1 can be provided only at intersections where the user needs route guidance. This means that the audio route guidance by the navigation system 1, which the user may find distracting, is not provided unless necessary.

(4) As the vehicle approaches an intersection where it is to make a right turn or a left turn to reach the destination, the right turn mark 42 or 43 or the left turn mark 51 or 52 comes up on display, reminding the user to turn right or left at the next intersection.

The navigation system 1 achieved in the embodiment described above allows for the following variations.

(1) In a navigation system in which the advancing direction of the subject vehicle 16 is detected with a vibration gyro 14a or the like and the roadmap 31 is displayed at the display monitor 16 so as to set the direction of the subject vehicle 61 to point substantially upward at the display monitor 16 at all times, the orientation of the right turn mark 42 or 43 or the left turn mark 51 or 52 coming up on display as the subject vehicle 61 approaches an intersection may remain unchanged regardless of the orientation of the roadmap 31.

Figure 10:
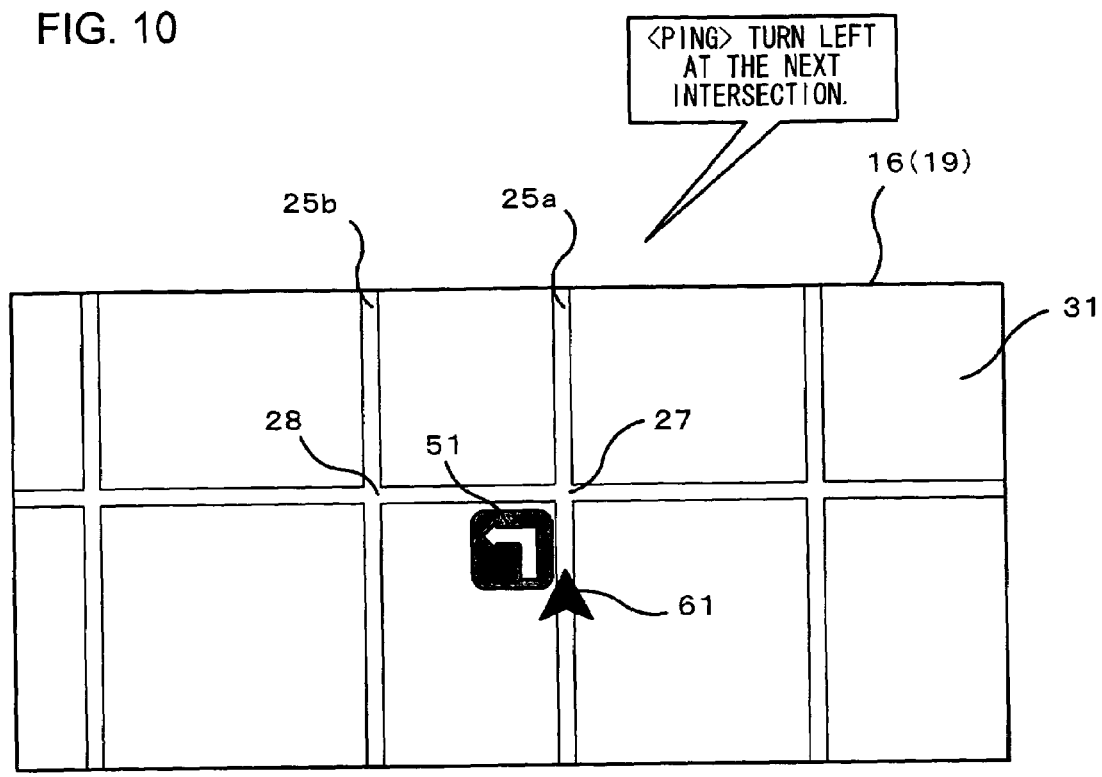
FIG. 10 illustrates another display screen that may be brought up at the display monitor as the vehicle approaches an intersection specified for a left turn instruction.

For instance, when the roadmap 31 is reoriented so as to set the advancing direction of the subject vehicle 61 upward, the left turn mark 51 may still point to the left, as shown in FIG. 10. Since the arrow in the left turn mark 51 still indicates the exact direction of the turn that the subject vehicle 61 needs to make at the intersection 27, the instruction can be grasped intuitively with ease.

(2) In a navigation system in which the roadmap 31 is always displayed at the display monitor 16 pointing in a substantially unchanged direction, e.g., pointing in a north up direction at all times, the right turn mark 42 or 43 or the left turn mark 51 or 52 coming up on display as the subject vehicle 61 approaches an intersection may indicate a right turn or a left turn along the direction matching the direction in which the subject vehicle 61 needs to turn.

Figure 11:
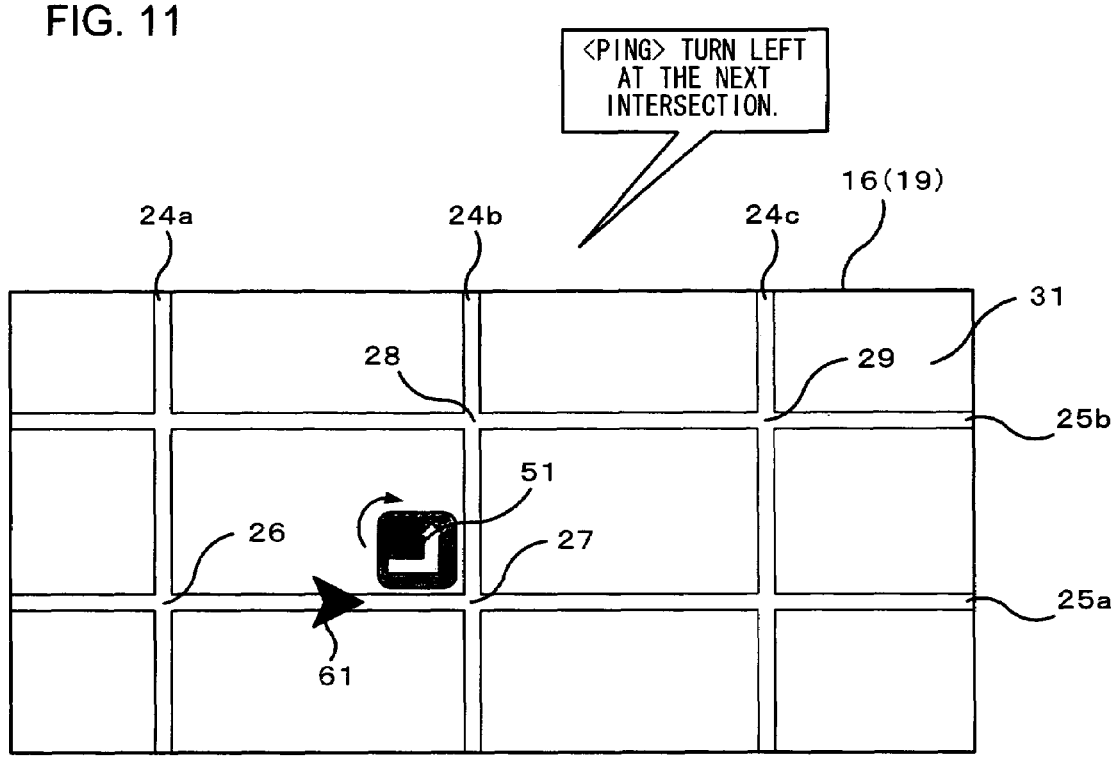
FIG. 11 illustrates yet another display screen that may be brought up at the display monitor as the vehicle approaches an intersection specified for a left turn instruction.

For instance, as shown in FIG. 11, the left turn mark 51 may be rotated in correspondence to the angle at which the subject vehicle 61 is to enter the intersection 27 on display as the subject vehicle 61 approaches the intersection 27, so that the orientation of the arrow in the left turn mark 51 matches the direction along which the subject vehicle 61 actually turns left at the intersection 27. The angle at which the subject vehicle 61 is to enter the intersection 27 may be calculated by detecting the orientation of the link at which the subject vehicle 61 is located. Since the direction indicated by the right turn mark 42 or 43 or the left turn mark 51 or 52 matches the direction in which the subject vehicle 61 actually needs to make a turn, the instruction can be read intuitively.

(3) In the embodiment, the user depresses an intersection while the right turn input button 33 or the left turn input button 34 is in a valid state to specify a right turn instruction or a left turn instruction to be provided at a desired intersection and display the right turn mark 42 or 43 or the left turn mark 51 or 53 at the intersection. Instead, the user, having depressed the right turn input button 33 or the left turn input button 34 with his finger 41, may drag the finger 41 to a desired intersection at which the right turn mark 42 or 43 or the left turn mark 51 or 52 is to be displayed, so that once he lifts his finger 41 off the touch panel 19, a right turn instruction or a left turn instruction is specified to be provided at the intersection and the right turn mark 42 or 43 or the left turn mark 51 or 52 comes up on display.

Figure 12A:
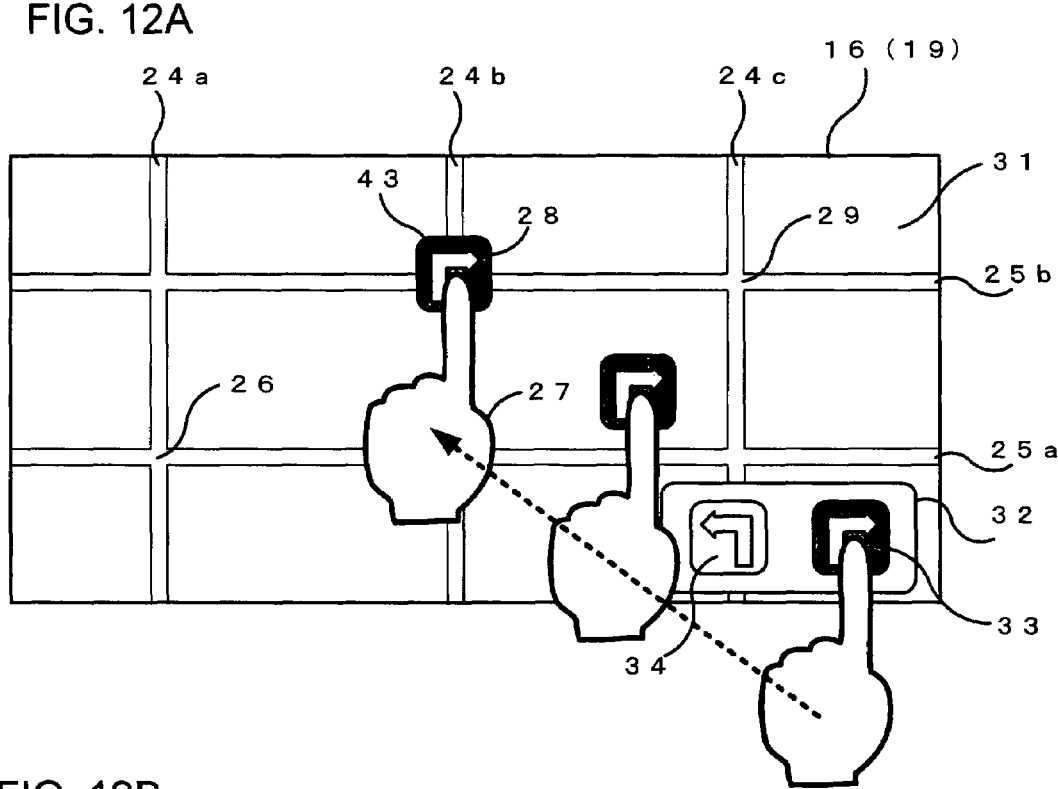
FIGS. 12A and 12B illustrate an operation performed to specify a right turn instruction to be provided at an intersection.
Figure 12B:
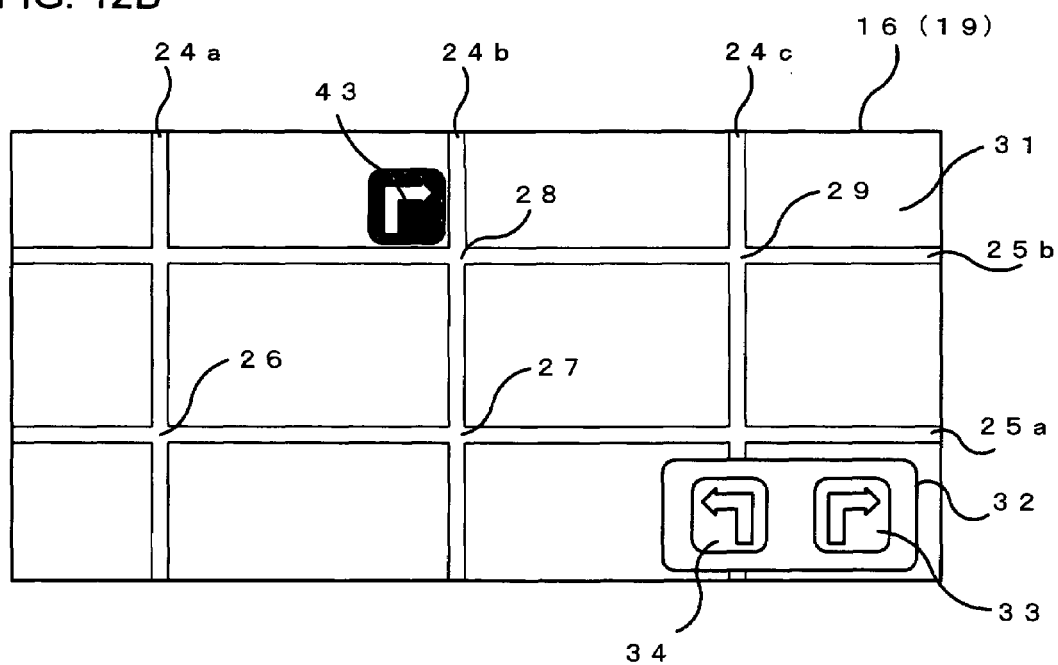

For instance, the finger 41 having depressed the right turn input mark 33 may be dragged over to the intersection 28, as shown in FIG. 12A, so that a right turn instruction is specified to be provided at the intersection 28 and the right turn mark 43 comes up on display when the finger 41 is lifted off the touch panel, as shown in FIG. 12B.

(4) While the user specifies a right turn instruction or a left turn instruction to be provided at a given intersection, thereby bringing up the right turn mark 42 or 43 or the left turn mark 51 or 52 at the intersection in the embodiment described above, turns along the diagonal/upward direction to the right, along the diagonal/downward direction to the right, along the diagonal/upward direction to the left, and along the diagonal/downward direction to the left at desired intersections as well as right and left turns may be specified and in correspondence, marks indicating turns along the diagonal/upward direction to the right, the diagonal/downward direction to the right, the diagonal/upward direction to the left and the diagonal/downward direction to the left at the intersections may be brought up on display.

While an explanation is given above in reference to the embodiment on an example in which the present invention is adopted in the navigation system 1 installed in a vehicle, the present invention is not limited to this example. The present invention may instead be adopted in a portable navigation system that can be carried by a person. It may also be adopted in a portable telephone equipped with a navigation function. A touch panel should be installed at the screen of such a portable navigation system or portable telephone.

Furthermore, the control program for the navigation system 1 may be installed in a personal computer so as to enable the personal computer to function as a navigation system. In such a case, the control program may be provided in a recording medium such as a DVD-ROM or a CD-ROM or through a data signal on the Internet or the like to enable the personal computer to function as a navigation system. Thus, the control program that will allow a personal computer to function as a navigation system with the features described above can be distributed as a computer-readable computer program product adopting any of various modes including a recording medium and a carrier wave. A touch panel should be installed at the display screen of a personal computer used in such applications.

The above described embodiment is an example and various modifications can be made without departing from the spirit and scope of the invention.

What is claimed:

1. A navigation system comprising:
    a roadmap display unit that displays a roadmap at a display monitor;
    a current position detection unit that detects a current position of the navigation system;
    a touch panel disposed over the display monitor that outputs a positional signal based on a position at which the touch panel is pressed;
    a specifying unit that specifies an intersection displayed in the roadmap by receiving the positional signal output from the touch panel;
    a setting unit that sets a right turn instruction or a left turn instruction for the intersection specified by the specifying unit; and
    a guidance unit that provides guidance based upon the right turn instruction or the left turn instruction having been set, as the detected current position moves to a point at or within a predetermined distance to the specified intersection.

2. A navigation system according to claim 1, wherein:
    the navigation system is installed in a vehicle; and
    the current position detection unit detects a current position of the vehicle in which the navigation system is installed.

3. A navigation system according to claim 1, further comprising:
    a display control unit that displays a right turn input button and a left turn input button on the display monitor; and
    a selection unit that selects one of the right turn input button and the left turn input button by receiving the positional signal from the touch panel; wherein:
    the setting unit sets the right turn instruction and the left turn instruction at the specified intersection according to the selected button.

4. A navigation system according to claim 1, wherein:
    the setting unit sets a right turn instruction or a left turn instruction for each intersection at which a right turn or a left turn is to be made.

5. A navigation system according to claim 1, wherein:
    the setting unit displays a mark indicating a right turn or a left turn at the intersection having been set.

6. A navigation system according to claim 1, wherein:
    as the detected current position moves to a point at or within a predetermined distance to the intersection having been set via the setting unit, the guidance unit displays a mark indicating a right turn or a left turn based upon the right turn instruction or the left turn instruction having been set.

7. A navigation system according to claim 6, wherein:
    if a display direction of the roadmap is adjusted to set an advancing direction of the vehicle pointing upward at the display monitor, the guidance unit displays the mark indicating the right turn or the left turn so that the direction of the right turn or the left turn indicated by the mark remains unchanged regardless of the advancing direction of the vehicle, and if the display direction of the roadmap remains unchanged, the guidance unit displays the mark indicating the right turn or the left turn so that the direction of the right turn or the left turn indicated by the mark matches a direction along which the vehicle turns right or left at the intersection.

8. A navigation system according to claim 1, wherein:
    as the detected current position moves to a point at or within a predetermined distance to the intersection having been set via the setting unit, the guidance unit provides audio guidance indicating a right turn or a left turn based upon the right turn instruction or the left turn instruction having been set.

* * * * *